United States Patent [19]
Acampora

[11] 4,309,764
[45] Jan. 5, 1982

[54] TECHNIQUE FOR INCREASING THE RAIN MARGIN OF A SATELLITE COMMUNICATION SYSTEM

[75] Inventor: Anthony Acampora, Freehold, N.J.

[73] Assignee: Bell Telephone Laboratories, Incorporated, Murray Hill, N.J.

[21] Appl. No.: 51,022

[22] Filed: Jun. 22, 1979

[51] Int. Cl.$^3$ ............................................. H04J 3/16
[52] U.S. Cl. ..................................... 370/83; 370/104; 371/5; 455/12
[58] Field of Search ...................... 370/83, 84, 99, 104, 370/110; 371/5, 41; 455/12, 13

[56] References Cited

U.S. PATENT DOCUMENTS

| | | | |
|---|---|---|---|
| Re. 28,577 | 10/1975 | Schmidt | 179/15 |
| 3,359,543 | 12/1967 | Corr et al. | 370/24 |
| 3,505,479 | 4/1970 | Hodge | 179/15 |
| 3,534,264 | 10/1970 | Blasbalg et al. | 370/84 |
| 3,632,885 | 1/1972 | Herold | 179/15 |
| 3,634,628 | 1/1972 | Sekimoto et al. | 179/15 |
| 3,649,764 | 3/1972 | Maillet | 179/15 |
| 3,676,778 | 7/1972 | Mori | 325/4 |
| 3,848,093 | 11/1974 | Edstrom | 179/15 |
| 4,047,151 | 9/1977 | Rydbeck et al. | 455/12 |

OTHER PUBLICATIONS

*Datamation*, Jul. 1978, "The Future of Commercial Satellite Telecommunications" by White et al., pp. 94–102.

Conference Record of the 26th Convention of Nuclear Electronics and Aerospace; Rome, Italy, Mar. 9–18, 1979, "Technical Aspects in the Future Development of Satellite Communication Systems" by Carassa, pp. 22–42.

*Primary Examiner*—Douglas W. Olms
*Attorney, Agent, or Firm*—Erwin W. Pfeifle

[57] ABSTRACT

The present invention relates to a technique for increasing the rain margin at ground stations of a satellite communication system. In the present technique, spare TDMA time slots in each frame sequence are shared among all ground stations as required by stations experiencing a fade condition which exceed a predetermined power margin. Additional up-link power margin at a faded transmitter can be achieved by either increasing power transmission of a normal burst or by the use of spare time slots plus encoding and preamble field extension techniques for burst extension. Additional down-link power margin to a faded receiver is accomplished by either increased transmitter power transmission or by the use of burst extension and coding and field extension techniques. Apparatus for implementing framing, carrier and clock recovery and start of message detection using extended fields and coding techniques for other data at a transmitter and receiver and disclosed to overcome fade conditions.

10 Claims, 12 Drawing Figures

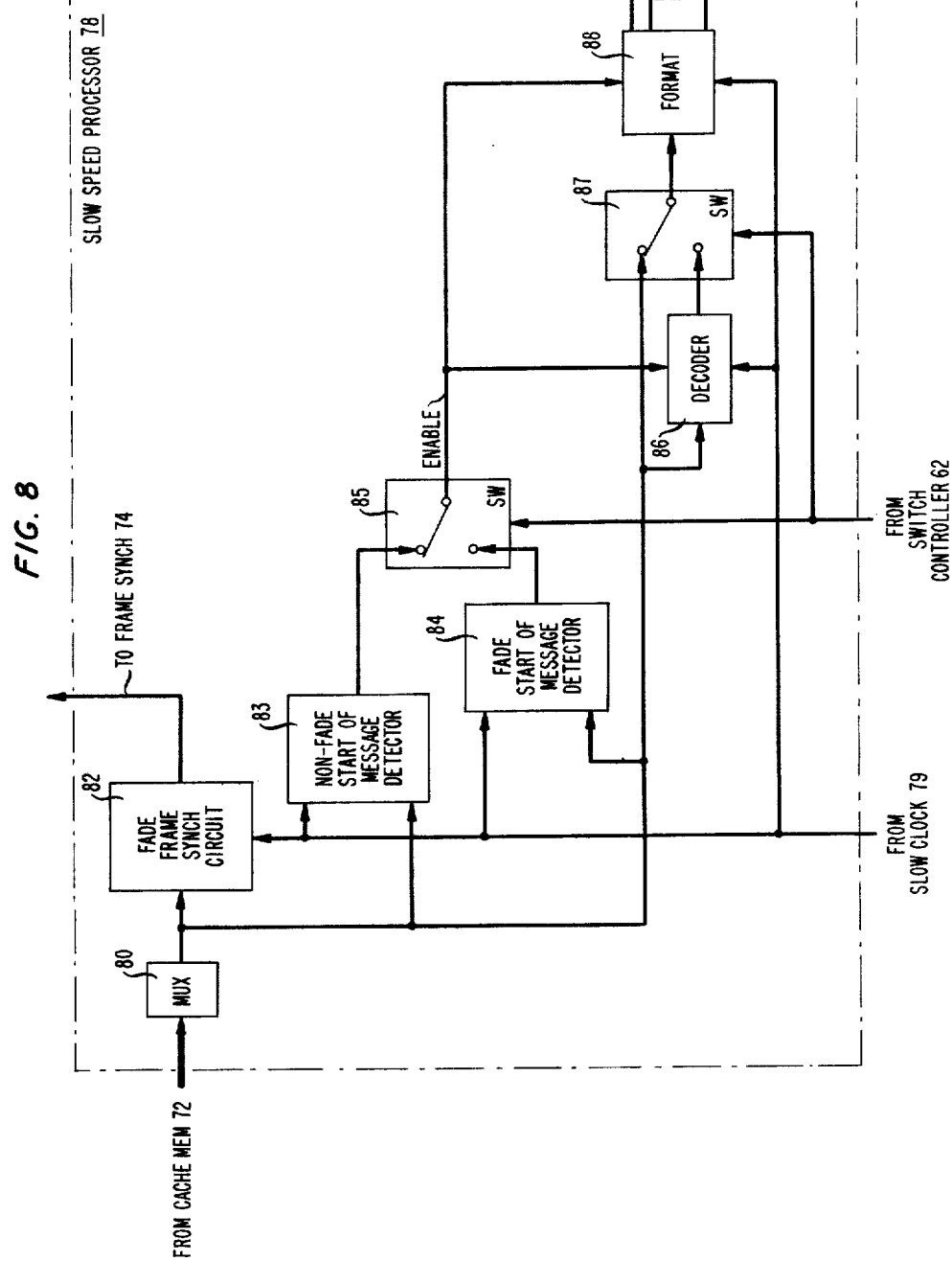

TECHNIQUE FOR INCREASING THE RAIN MARGIN OF A SATELLITE COMMUNICATION SYSTEM

BACKGROUND OF THE INVENTION

1. Field of the Invention

The present invention relates to a technique for increasing the rain margin of a satellite communication system and, more particularly, to a technique which permits communication between ground stations of a satellite communication system via the satellite where one or more ground stations are experiencing a fade condition above the power margin.

2. Description of the Prior Art

The current trend in communication satellites appears to be increasingly toward the use of the 12/14 GHz and higher frequency bands and the use of digital modulation formats with Time Division Multiple Access (TDMA) techniques. The former provides freedom from existing 4/6 GHz terrestrial interference and also provides higher antenna gain and narrower beams for a given size aperture, while digital transmission in conjunction with TDMA provides for more efficient utilization of the available satellite system resources.

A major drawback associated with 12/14 GHz systems is the signal attenuation associated with rainfall. In general, attenuation at these frequencies is an increasing function of rain rate, with the result that, for example, over a large portion of the United States, significant power margin must be provided to prevent excessive outage due to rain fades.

A typical prior art technique for overcoming rain fades is disclosed in an article "The Future of Commercial Satellite Telecommunications" by W. White et al. in *Datamation*, July 1978 at pp. 94-102 which discloses at pp. 98-99 that it may be possible to overcome rain attenuation in satellite systems by transmitting the same burst several times. The ground station in the momentary rain zone can add the multiple signals for the same burst together to reconstruct the original signal.

Other standard techniques which might be employed to provide rain margin include (1) increasing the radiated power of the satellite and earth stations, (2) improving the noise figure of the receivers, (3) installing larger ground station antennas, and (4) providing site diversity. Unfortunately, these techniques (1)-(4) are costly in that permanently dedicated system resources are used only infrequently, i.e., when it rains. Therefore, the system has been tremendously overdesigned for the clear air conditions which might exist more than 99.9 percent of the time at any particular ground location if, for example, 15 or 20 dB rain margin is required to achieve the desired rain outage.

The problem remaining in the prior art is to provide method and apparatus which can increase the rain margin of a satellite communication system by as much as, for example, 10 dB without requiring additional system resources which are only infrequently called upon for use.

SUMMARY OF THE INVENTION

The foregoing problem has been solved in accordance with the present invention which relates to a technique for increasing the rain margin of a satellite communication system and, more particularly, to a technique that permits communication between ground stations of a satellite communication system via the satellite where one or more ground stations are experiencing a fade condition above the normal power margin without the requirement of additional system resources.

It is an aspect of the present invention to provide a technique for increasing the rain margin of a satellite communication system without the requirement of additional system resources which permit continued framing, carrier and clock recovery and start of message detection to be effected at a ground station experiencing a fade condition.

In accordance with the present invention, spare TDMA time slots in each frame sequence which are obtained from a pool or by rearrangement of spare time slot assignments are provided for use in communications with ground stations experiencing, for example, rain attenuation events which exceed a predetermined power margin. Additional up-link power margin at a rain attenuation station can be achieved by either increased power transmission of the information in a normal burst or by the use of pool or rearranged spare time slots and field extension and coding techniques for burst extension and additional margin. Additional down-link power margin is accomplished by each transmitter communicating with the affected ground station using burst extension and coding techniques. To enable continued carrier and clock recovery and start of message detection at an affected receiver, transmissions of these preamble sections have their fields extended. Each transmitter, therefore, must include means which can be switched to provide the appropriate nonfade-uncoded or fade-encoded preamble and message information to enable transmission to (a) nonfaded receivers, (b) faded receivers or (c) transmission to a nonfaded receiver where the transmitter experiences a fade condition and increased power transmission is not available. At each receiver which can experience a fade or receive encoded information from a faded transmitter not capable of increasing transmission power, each receiver includes means which can be switched to receive and process unity or greater extended field frame synchronization signals, carrier and clock signals, start of message signals and other encoded preamble and data information destined for the receiver to overcome the fade condition.

Other and further aspects of the present invention will become apparent during the course of the following description and by reference to the accompanying drawings.

BRIEF DESCRIPTION OF THE DRAWING

Referring now to the drawings, in which like numerals represent like parts in the several views:

FIG. 8 illustrates a typical arrangement for the slow speed processor in the arrangement of FIG. 6;

DETAILED DESCRIPTION

The present invention is described with relation to a time division multiple access (TDMA) satellite communication system comprising a single scanning up-link beam and a single scanning down-link beam for purposes of simplicity. It is to be understood, however, that such description is exemplary only and is for the purposes of exposition and not for purposes of limitation. It will be readily appreciated that the inventive concept is equally applicable to area beam coverage systems, fixed multiple spot beam systems and single or multiple scannable spot beam systems or any combination thereof.

Figure 1:
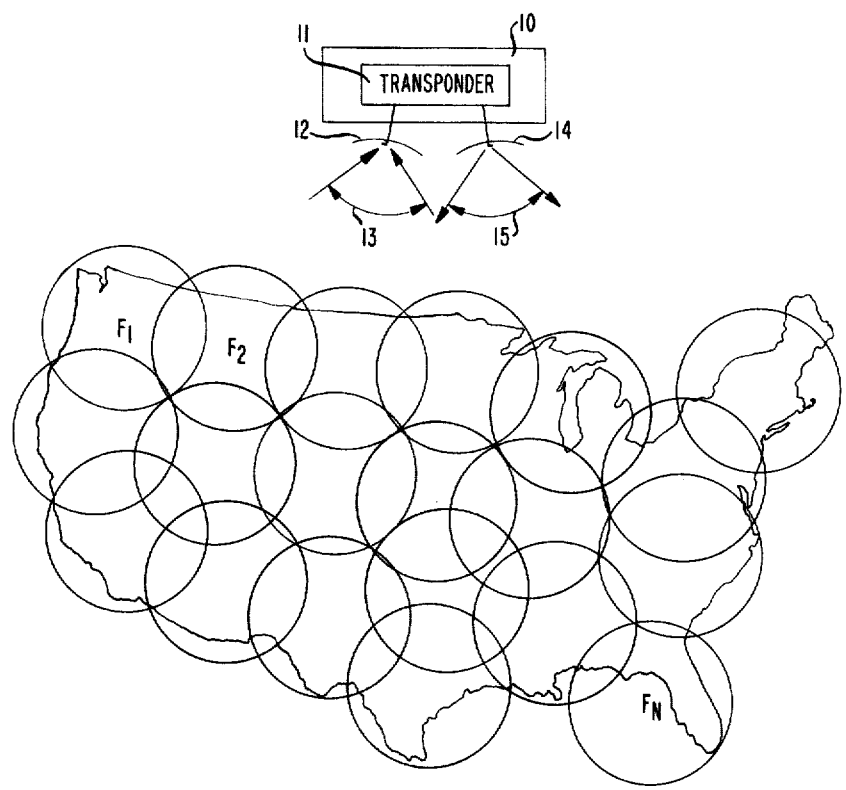
FIG. 1 illustrates a typical subdivision of the United States into N spot beam footprints which are serviced by an exemplary single up-link and down-link scanning spot beam satellite.

As shown in FIG. 1, the single scanning TDMA spot beam satellite communication system which will be used to describe the present invention comprises a satellite 10 including a single transponder 11 coupled to an up-link antenna 12, capable of receiving a single scanning up-link beam 13, and a down-link antenna 14 capable of transmitting a single scanning beam 15 which can cover an entire service area. The service area, which is shown as the continental United States, is divided into N spot beam footprints, labeled $F_1$ through $F_N$. Each footprint can comprise at least one ground station but typically contains several ground stations.

Figure 2:
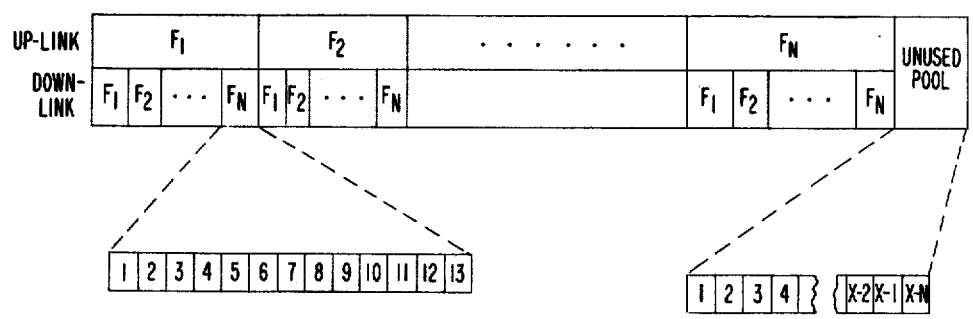
FIG. 2 illustrates a typical TDMA switching frame showing the preassigned or demand assigned interconnection sequence between the N spot beam footprints of FIG. 1 and an unused pool of time slots.

FIG. 2 illustrates an exemplary TDMA switching sequence performed at the satellite to interconnect the various footprints shown in FIG. 1. Within each frame are dedicated time slots used to establish a two-way communication channel between a ground station and itself and each remote station in the network. For example, in the initial subframe in each frame, antenna 12 is directed to receive an up-link burst from ground stations in footprint $F_1$ which include TDMA bursts destined via the down-link scanning beam 15 for ground stations in footprints $F_1$ to $F_N$ in sequence. Therefore, during the initial subframes, antenna 12 is directed toward footprint $F_1$ to receive transmissions from the ground stations disposed therein while antenna 14 directs down-link beam 15 from footprint $F_1$ to $F_N$ in sequential subframes and in synchronism with the proper transmission time for each associated burst. A similar subframe sequence continues in each frame period for up-link transmissions from ground stations in each of footprints $F_2$ to $F_N$. Included within each subframe are a number of time slots which are used for transmitting message bursts comprising preamble and data information between two ground stations. For example, in FIG. 2 in the subframe between ground stations in footprint $F_1$ and footprint $F_N$, thirteen time slots are shown. It is to be understood that such number is exemplary only and not for purposes of limitation in that each subframe may contain any number of time slots dependent on traffic demand between the two footprints. Also included within each frame, but not shown in FIG. 2, are dedicated portions of subframes, e.g., a time slot, which are used to establish two-way signaling channels between a ground station in one of the footprints designated a master ground station and each of the remote ground stations in the network using any suitable technique known in the art. The signaling channels are used to, for example, enable TDMA synchronization, distribute system status information, handle new requests for service, assign time slots, etc. Except for the signaling slots, all the other time slots can, if needed, be assigned upon demand.

Also shown at the end of the frame is a pool of spare or unused time slots. As will be described hereinafter, these slots are to be made available to ground stations experiencing rain attenuation. It is to be understood that the spare or unused time slots can be obtained in the proper sequence by rearranging the time slot assignments in a frame and using the signaling channels to inform each ground station of such rearrangement. The time slots from the pool can be made available to any ground stations experiencing up-link or down-link rain attenuation. However, a more attractive means for combating up-link fades is via up-link power control. For this approach, the up-link power during rain events is adjusted such that a constant incident power is maintained at the satellite. When the rain attenuation exceeds the margin provided by the maximum ground station transmitter power, fading occurs on the up-link. Since up-link power is usually not at a premium, the maximum transmitter power can often be set so as to overcome the fade condition. Thus, up-link power control represents a very attractive means for combating up-link loss of signal while maintaining a constant signal-to-interference ratio at the satellite. However, it is possible that certain ground stations are not capable of handling additional up-link power to overcome a fade condition due to the circuitry employed, in which case the use of reassigned spare time slots or pool time slots in conjunction with encoding techniques, as will be described hereinafter, will become necessary.

When a down-link fade occurs, the carrier-to-noise ratio at the receiving ground station experiencing the fade is no longer sufficient to maintain the desired bit error rate. Thus, the capacity into that ground station is reduced. Suppose, for example, the rain attenuation is such that the signal level falls 8 dB below the value required to maintain a voice grade bit error rate (BER) equal to $10^{-3}$. The channel error rate for Gaussian noise is then about 0.1. A lower bit error rate would result if both Gaussian noise and peak-limited interference set the error rate. The BER, however, can still be maintained at $10^{-3}$ or lower in accordance with the present invention.

When power measurements at a ground station indicate that attenuation exceeding the built-in power margin is imminent, then such ground station uses the signaling link to notify the master ground station, as well as all transmitting stations communicating with the fade station, that a fade is about to occur. The master ground station then assigns time slots from the reserve pool of FIG. 2 or by reassigning traffic to obtain spare time slots for use in the following manner. Assuming that before the fade, the ground station is using the time slot equivalent of V voice circuits. From the pool or rearranged time slots, the equivalent of, for example, 3 V additional time slots are borrowed, thereby providing an equivalent of 4 V voice circuits for that ground station. At the originating ground station for each voice circuit, for example, a rate $r=\frac{1}{3}$ convolutional code is employed which produces three channel bits for each information bit. The switching sequence at the satellite is trivially modified such that each voice circuit packet is transmitted as four contiguous packets which contain the encoded channel bits, transmitted at the original full bandwidth data rate, plus an extended preamble containing 7-10 times the clear air number of bits required to enable carrier and clock recovery and start of message detection at a carrier-to-noise ratio as much as 8-10 dB below system margin. The bandwidth of the carrier and clock recovery circuits and start of message detection circuits at the receiver are correspondingly reduced by a factor of 7-10.

At the receiver, the entire extended message burst for each voice circuit is serially detected by either a soft decision or hard decision detection device and stored in a high-speed buffer. Since the duty cycle of message burst arrivals is small, the buffer is read out during the time interval between message burst arrivals and the detected channel bits are processed by a relatively slow speed decoder to recover the original information bits. When the fade has passed, the process is reversed and the extra time slots are returned to th pool to be reassigned as needed to other ground stations in the network.

In accordance with this approach, a relatively small number of equivalent voice circuits can be shared among a large number of users to provide additional rain margin when needed. The additional resources are not wasted by merely retransmitting uncoded data a number of times, but rather the entire transponder bandwidth is exploited to provide additional gain through redundancy coding. Other, lower rate codes might be substituted for the rate $r=\frac{1}{3}$ convolutional code mentioned hereinbefore to increase the fade margin still further.

The TDMA time slots reserved for rain fades can, of course, be allocated to nonfade ground stations during periods of high system demand. During clear air conditions, each ground station in the network presents an instantaneous demand for some number of equivalent voice circuit packets; the capacity of the satellite 10 is, however, fixed at C two-way voice circuits. Call blockage occurs whenever the total offered load exceeds C. A ground station using M one-way voice circuit and which experiences a fade now demands additional one-way circuits to remain operational; the number of additional circuits required increases with the fade depth, and coding is employed in an attempt to minimize the additional demand. Provided that the additional circuits are available, outage will not occur. Thus, rain attenuation can be interpreted as placing additional demands upon the voice circuit resources of the satellite, and outage is interpreted in terms of demand exceeding capacity, i.e., blocked calls. Rain outage, then, is more likely to occur during the busy hour, and would be virtually nonexistent at other times of the day.

For practical reasons, it might be desirable to limit the excess demand for voice circuits due to rain attenuation to a factor of four or five above the clear air demand. Then, outages will occur when the attenuation exceeds the additional rain margin provided by these extra circuits. Thus, when designing the network, the offered traffic must be contained to a level such that the desired rain outage and call blockage probability can be achieved by the satellite capacity C. Factors affecting this design would include the rain statistics at the various ground stations, the built-in rain margin, the number of ground stations, the clear air Erlang load of each ground station, and the statistical dependence of rain attenuation in excess of the built-in margin at the various ground stations. If the built-in margin is about 10 dB, then excess attenuation events would be independent for ground stations separated by, for example, 25 to 30 miles or more.

The TDMA overhead associated with reserving time slots for rain events can be estimated in the following manner. Suppose that there are S ground stations in the network, and a total availability of N one-way voice circuits. A number, R, of the N one-way voice circuits are reserved for rain events. Thus, on the average, each ground station uses (N-R) one-way circuits. The value R is determined by noting that, for each circuit into a given ground station, three additional circuits are needed to provide the additional rain margin of 10 dB. A reserve pool sufficient to accommodate M simultaneous fades is provided:

$$3 M(N-R)/S = R => R = 3 MN/(S+3 M). \qquad (1)$$

Thus, the TDMA inefficiency n is given by:

$$n = \frac{R}{N} = \frac{3M}{S + 3M}. \qquad (2)$$

Thus, for example, for 100 sites, and allowing for two simultaneous fades, the inefficiency or cost is under 6 percent.

Figure 3:
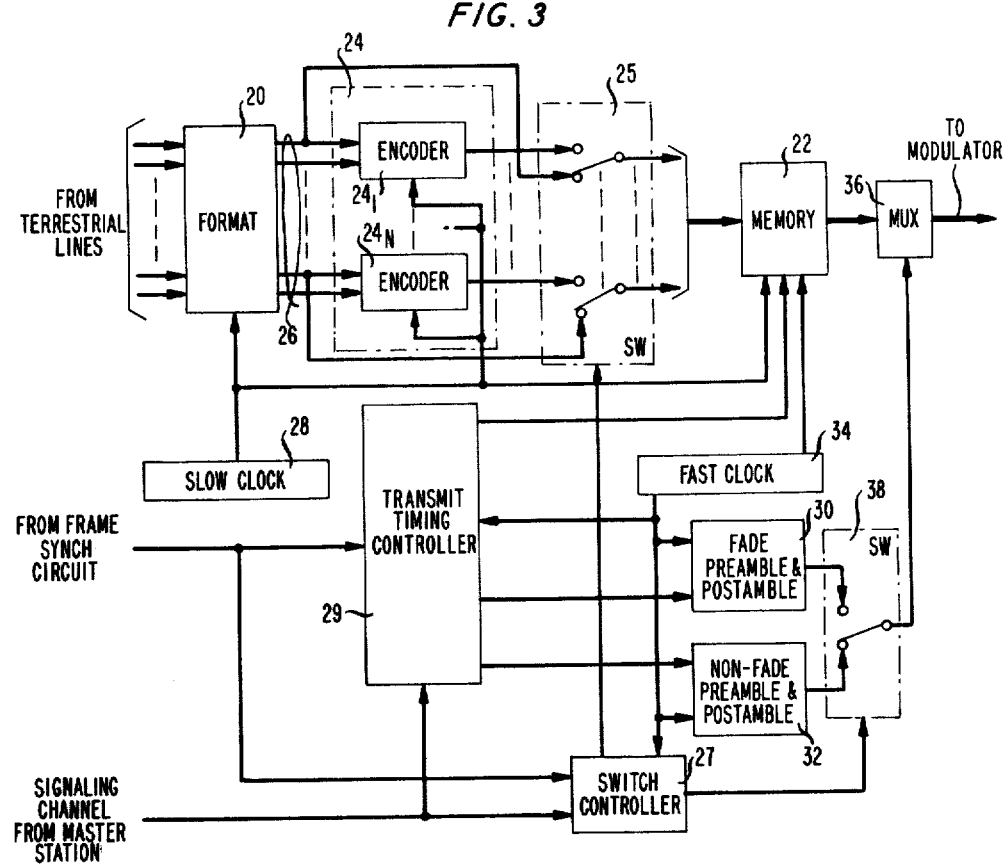
FIG. 3 illustrates a preferred arrangement TDMA burst modem data processing arrangement found at each transmitting ground station in accordance with the present invention.

The equipment needed to implement the pooled resource approach to combat rain fades consists for the most part of digital electronics which operates at a rate much less than the full transponder data rate of, for example, 600 Mbits/sec. The bit rate reduction is achieved by virtue of a small duty cycle TDMA mode of operation. FIG. 3 illustrates a preferred arrangement in accordance with the present invention for processing data from terrestrial lines at a transmitting burst modem for transmission via the satellite to destination ground stations which may or may not be experiencing fade conditions.

In the arrangement of FIG. 3, data and certain preamble information arriving at the present burst modem from terrestrial lines are received in a format circuit 20 which formats the received signals into the proper digital arrangement for subsequent transmission to the satellite as is well known in the art. Essentially, the format circuit comprises a number of subcircuits which provide the interface between the terrestrial lines and the satellite by determining where the data and certain preamble information received on the terrestrial lines is going in the satellite network and formats it into packets of information for storage in memory 22 for appropriate time transmission via the satellite to the destination ground station.

Disposed between format circuit 20 and memory 22 is an encoder 24 and a switching means 25. The output of format circuit 20 on bus 26 is simultaneously applied to the encoder 24 and one input of switch 25, with the encoded output from encoder 24 being applied to a second input of switch 25. Encoder 24 comprises one or more encoding circuits $24_1$–$24_n$, the number n of which is determined by the encoding rate of an encoding circuit and the bit rate of the data received on bus 26 from each of the terrestrial lines. For example, if an encoding circuit has an encoding rate of 10 Mbits/second and data received from a terrestrial line is at a 30 Mbit/second rate, then three (n=3) parallel encoding circuits would be required, etc. The number n of encoders 24 required is dependent on the highest data rate expected from any one of the terrestrial lines. Switching means 25 includes a separate switch for each encoding circuit and functions, under the control of switching controller 27, to pass either uncoded or encoded packets of data for storage in appropriate memory locations in memory 22. Switch controller 27 is synchronized via a frame synchronization circuit to normally activate switching means 25 to pass unencoded data and certain preamble information as shown in FIG. 3. However, when the present transmitting station is experiencing a fade condition and is incapable of increasing its power margin to overcome such fade or the data being formatted has as its destination a ground station experiencing a fade condition, then switch controller 27 activates switching means 25 to pass the encoded data and certain encoded preamble information for appropriate storage in memory 22. Slow clock 28 provides the necessary clock signals to format circuit 20, encoder 24 and memory 22 to provide for the relatively slow speed processing of the data from the terrestrial lines for storage in memory 22.

During the appropriate one or more time slots when a ground station transmits its burst in accordance with the frame sequence, for example, as shown in FIG. 2, a transmit timing controller 29, which is synchronized via a frame synchronization circuit with all other ground stations to effect proper transmission in time of all bursts in the frame sequence, enables memory 22 and a fade and a nonfade preamble and postamble memory designated 30 and 32, respectively. Once enabled, additional preamble information and any postamble information which may be required for proper ground station operation is transmitted by memories 30 and 32, and the stored data information in appropriate uncoded or coded form is transmitted from memory 22 in the appropriate sequence and bit rate, as governed by fast clock 34, to a multiplexer 36. A switch 38, under the control of switch controller 27, permits selection of either the fade or nonfade type additional preamble and postamble information in correspondence with the coded or uncoded other preamble and data information which is being sent therewith from memory 22.

The multiplexed preamble, data, and selective postamble information is transmitted by multiplexer 36 to a modulator (not shown) for up-converting to the proper frequency spectrum for transmission to the satellite. The transmitting timing controller 29 and switch controller 27 each include a memory which stores information related to the time slot assignments and whether a time slot burst is associated with a fade or nonfade type of transmission. Such stored information can continuously be up-dated by a master ground station transmitting the updated data in a signaling channel via the satellite to each of the ground stations affected.

Figure 4:
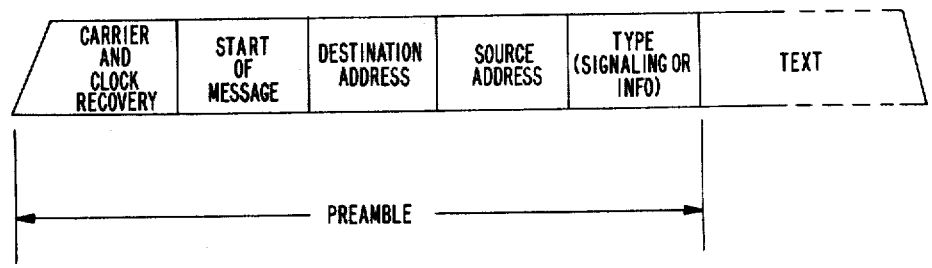
FIG. 4 illustrates an exemplary time slot burst structure for communications via the satellite between two ground stations of the network.

An exemplary nonfade type time slot burst packet structure is shown in FIG. 4. It is to be understood that such structure is merely for purposes of exposition and not for purposes of limitation since many other formats may be used. Each time slot burst is shown as comprising five fields of preamble information and one field of text which can include either subscriber transmitted information or signaling information. Postamble fields, when used, would appear at the end of a time slot burst after the text field. Typically, the preamble, as shown in FIG. 4, comprises separate unique words (UW) related to enabling carrier and clock recovery, information designating start of message, the destination ground station address, the source ground station address and the type of information in the text field, e.g., whether data or signaling information. The first two preamble fields, in accordance with the present invention, are stored in preamble and postamble memories 30 and 32 while the last three preamble fields shown would normally accompany the data from the terrestrial lines and, therefore, be stored in memory 22 in coded or uncoded form.

The modification needed in accordance with the present invention to assemble encoded rain attenuation bursts can be accomplished in the following preferred exemplary manner. By using the exemplary $K=8$, $r=\frac{1}{3}$ code mentioned hereinbefore, the system must be capable of operation at channel error rates as high as 0.1 to provide 7.5 dB of extra rain margin. The extended burst using 4 time slots also is divided into six fields, each serving the same function as before. However, fields number 1 must be extended by a factor of, for example, 6 over the nonfade condition corresponding fields to provide the same accuracy of carrier and clock recovery. Also, the start-of-message unique word must be similarly extended to enable identification at the receiver under degraded channel conditions as will be described hereinafter. The data of the remaining preamble fields and the text field are transmitted in coded form, and one of the at least one encoders of encoder 24 to achieve encoding for the $K=8$, $r=\frac{1}{3}$ code is shown in FIG. 5 and is generally known as a convolutional coder.

Figure 5:
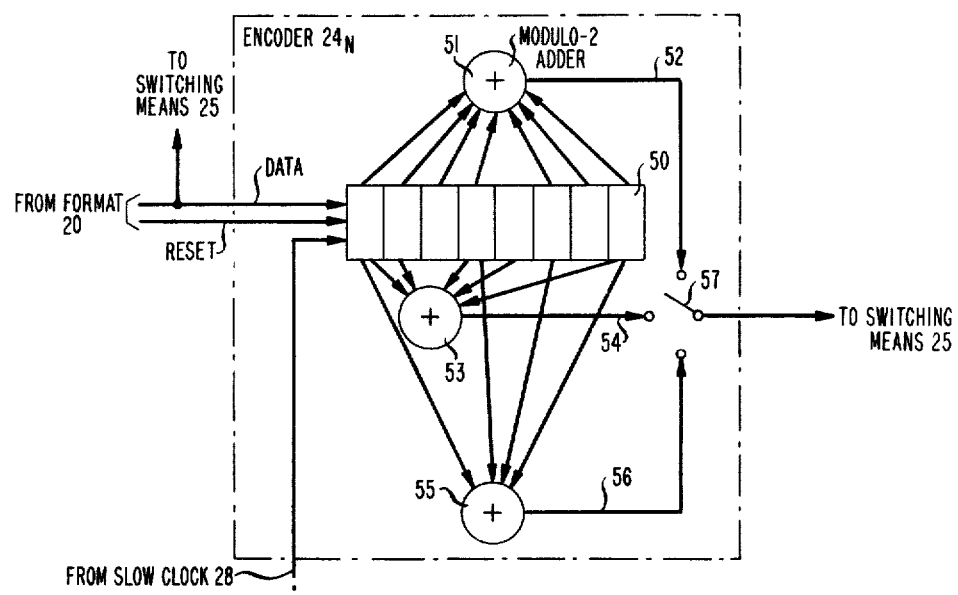
FIG. 5 illustrates a typical K=8, r=⅓ rate convolutional encoder.

In FIG. 5 a reset signal, which can be sent by format circuit 20 or any other suitable circuit which detects the start of a message, initializes a shift register 50. Once initialized, digital data and certain digital preamble information relating to a time slot burst from format circuit 20 is shifted into eight-bit shift register 50 at the rate of one bit every T seconds as governed by slow clock 28. A first modulo-2 adder 51 operates on all but the fifth bit stored in register 50 at any instant in time to produce a resultant first binary bit on a transmission line 52. Simultaneously therewith, a second modulo-2 adder 53 operates on the first, second, fourth, fifth and eighth bit to produce a resultant second resultant binary bit on second transmission line 54 while a third modulo-2 adder 55 operates on bits one, four, six and eight in register 50 to produce a third resultant binary bit on third transmission line 56. During each T second, a commutator 57 first selects the signal on first transmission line 52, then the signal on second transmission line 54 and then the signal on third transmission line 56. Thereby, three binary digits are transmitted to switching means 25 for each bit shifted into register 50 from format circuit 20. Therefore, whenever switching means 25 is activated to choose the encoded version of the signal on bus 26, memory 22 will also have to be enabled to accept the increased length of the encoded data and preamble information.

Figure 6:
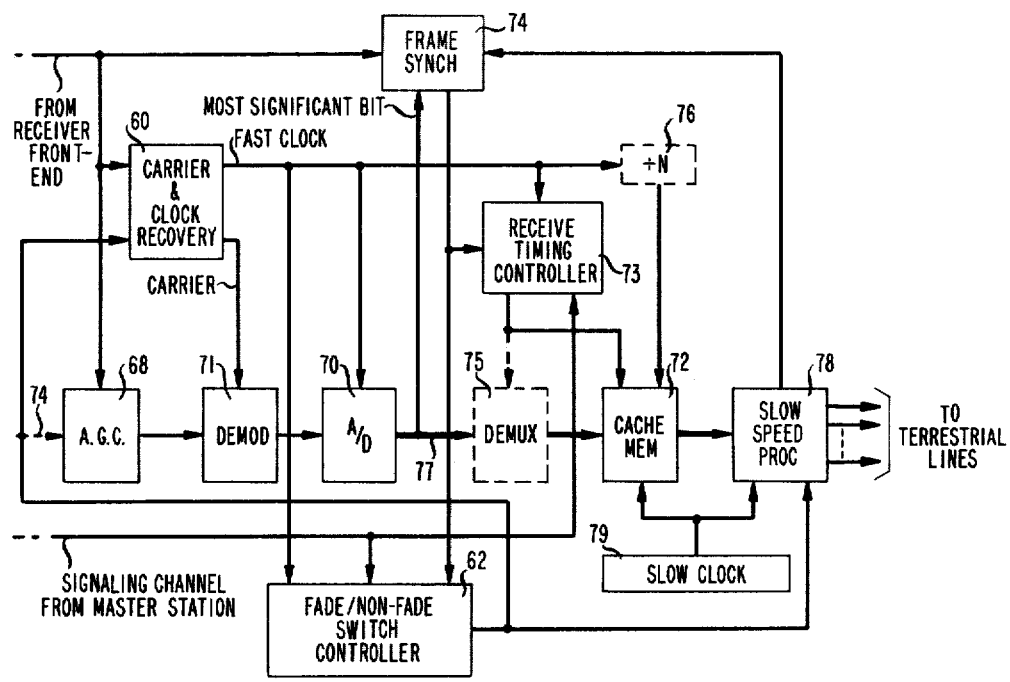
FIG. 6 illustrates a preferred arrangement for a TDMA burst modem data processing arrangement which is found at each receiving ground station that might receive encoded burst information in accordance with the present invention.
Figure 7:
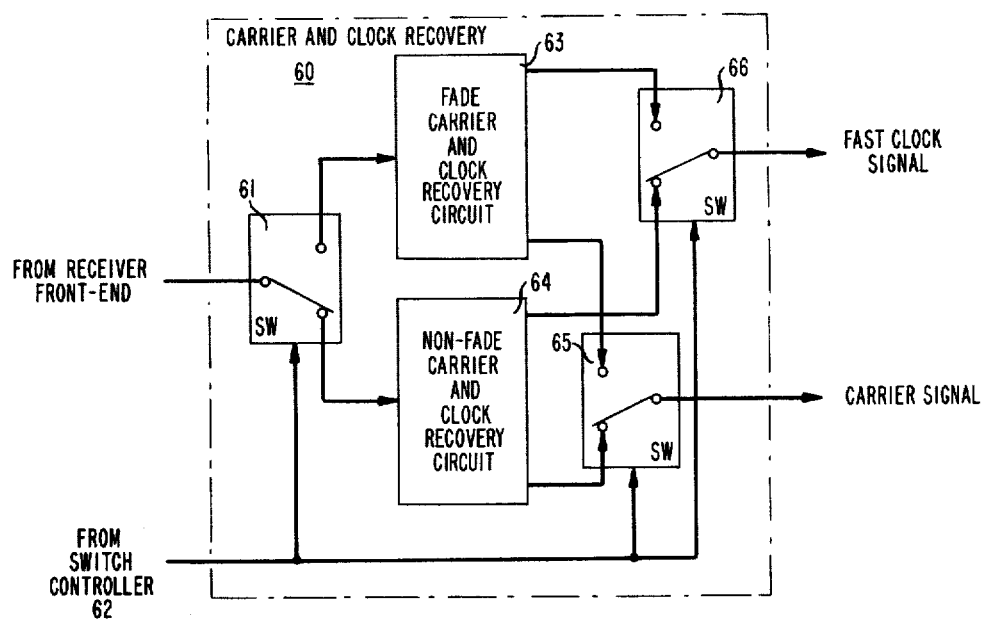
FIG. 7 illustrates a typical carrier and clock recovery arrangement for use in the arrangement of FIG. 6.

FIG. 6 illustrates a preferred arrangement for the receiving section of each ground station which may be required to receive coded signals from a ground station of the network via the satellite. The signal from the receiver front-end is received in a carrier and clock recovery circuit 60 which is shown in more detail in FIG. 7. There, the input signal from the receiver front-end is directed by a switch 61 under the control of a switch controller 62 to either a fade or nonfade carrier and clock recovery circuit, designated 63 and 64, respectively, each of which is capable of deriving the carrier and the clock signal from the respective extended or nonextended carrier and clock recovery unique word of the first field of the preamble shown in FIG. 4 as well as from the remainder of the burst in a manner well known in the art. The separate carrier and clock signals generated by either one of recovery circuits 63 and 64 are directed via switches 65 and 66, which are also under the control of switch controller 62, to the appropriate receive circuits of FIG. 6. Circuits 63 and 64 can comprise any suitable circuit which is known that is tuned to the extended or normal carrier and clock recovery unique word.

The signal received from the receiver front-end is also applied in FIG. 6 to an automatic gain control (AGC) circuit 68 which maintains the received peak signal within certain maximum limits for subsequent processing by an analog-to-digital (A/D) converter 70. AGC circuit 68 can be used on a full-time basis or only during fade conditions and under the latter condition an optional enable lead 74 from switch controller 62 would be required along with by-pass switches in AGC circuit 68 to enable insertion or by-pass of AGC circuit 68. The resultant signal from AGC 68 is demodulated in demodulator 71 using the recovered carrier signal generated by carrier and clock recovery circuit 60 and the output signal, which is the original digital transmitted signal plus white, Gaussian noise and any other interfering signals which may have been introduced, is applied to analog-to-digital (A/D) converter 70 which digitizes the analog signal to an accuracy of one bit or more. If one bit accuracy is desired, the A/D converter 70 is a simple bit detector. It is to be understood that AGC circuit 68 may be disposed between demodulator 71 and A/D converter 70 rather than before demodulator 71 as its function is primarily to control the received signal to within the peak processing range of A/D converter 70.

The bit stream output of A/D converter 70 is stored in a cache memory 72 under the control of a receive timing controller 73 which receives input signals corresponding to the period of the normal frame marker, generated by frame synchronization circuit 74, and the fast clock, generated by carrier and clock recovery circuit 60, to open a window and allow the storage of the information received in each time slot burst destined for this receiver in cache memory 72. Receiving timing controller 73 also receives signaling information from the master ground station for updating a memory included therein which stores the current timing information related to the reception of all time slot bursts within a frame period associated with its ground station under a nonfade or fade condition of this receiver or a remote transmitter sending encoded data. Frame synchronization circuit 74 can comprise any suitable circuit as, for example, the arrangement disclosed in the article "Baseband Processing in a High Speed Burst Modem for a Satellite Switched TDMA System" by A. Acampora et al in the Conference Record of the 4th *International Conference On Digital Satellite Communication*, Montreal, Canada, October 23-25, 1978 at pp. 131-138.

An optional demultiplexer 75 can be disposed between A/D converter 70 and cache memory 72 to transform the fast serial data rate on each line from converter 70 to a slower parallel data rate when memory 72 has a data storage rate which is less than the data output rate of A/D converter 70. When demultiplexer 75 is required, a divide-by-N circuit 76 should be included to comparably reduce the fast clock rate from carrier and clock recovery circuit 60 to cache memory 72 to the rate of the bits arriving from demultiplexer 75. The most significant bit of the converted signal generated by A/D converter 70 found on bus 77 is also applied to frame synchronization circuit 74 for providing an indication of whether the output signal from A/D converter 70 is representative of a "0" or a "1" in order for a received framing unique word to be detected by frame synchronization circuit 74.

The preamble and data information stored in cache memory 72 is read out between received bursts for processing in a slow speed processor 78 at a rate determined by slow clock 79 which functions similar to slow clock 28 of FIG. 3. An arrangement for slow speed processor 78 is shown in FIG. 8, where the information read out from cache memory 72 and appearing on the output bus is received in a multiplexer 80 which converts the parallel data received on the bus into a serial stream of data. The output from multiplexer 80 is concurrently applied to a fade condition frame synchronization circuit 82, a nonfade and a fade condition start of message detector circuit designated 83 and 84, respectively, a decoder 86 and one terminal of a first switching means 87.

Figure 9:
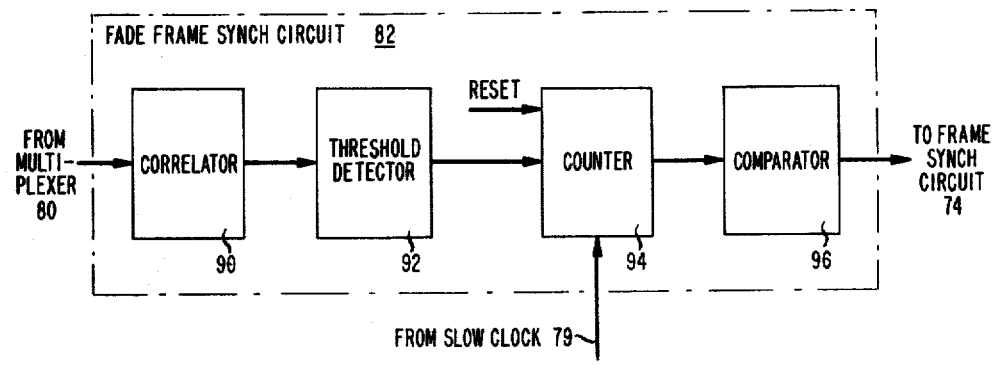
FIG. 9 illustrates a typical fade frame synchronization circuit arrangement for use in the slow speed processor of FIG. 8.

Fade condition frame synchronization circuit 82 essentially functions to detect whether or not a stored sequence from cache memory 72 contains a frame marker unique word and whether such unique word is stored in the proper location in the sequence. FIG. 9 illustrates a typical arrangement for fade frame synchronization circuit 82 and comprises a correlator 90, a threshold detector 92, a counter 94 and a comparator 96 in series. The digital signal from multiplexer 80 enters correlator 90 which generally shifts the arriving sequence of bits through a shift register and compares the sequence stored between shifts with a stored sequence corresponding to a frame marker unique word. In performing the comparison, correlator 90 determines how many errors exist between the stored and shifted-in word and generates an output signal representative of such error number. A threshold detector determines whether such error number exceeds a certain threshold number or not and generates a first output signal when such number does not exceed the threshold and a second output signal when such threshold is exceeded. A counter 94 which is reset to zero at the start of each stored sequence from cache memory 72, counts the clock pulses from slow clock circuit 79 until a first output signal from threshold detector 92 is received at which time the count is transmitted to a comparator 96. Comparator 96 compares the count received from counter 94 with a predetermined number representative of a count where such first output signal from threshold detector 92 should normally occur for perfect synchronization and transmits any difference in the compared counts to frame synchronization circuit 74. Circuit 74 uses the output from circuit 82 to maintain synchronization during a fade condition.

The nonfade and fade condition start of message detectors designated 83 and 84, respectively, each function to correlate the input serial bit stream from multiplexer 80 with a predetermined stored sequence to generate an output signal corresponding to an enable signal when a start of message unique word is detected. A second switching means 85 under the control of switch controller 62 connects the output from the proper one of detectors 83, 84, depending on whether or not the start of message field was extended or not, to decoder 86 and a format circuit 88. The input signal to format circuit 88 is selected by first switching means 87, under the control of switching controller 62, directly from the output of multiplexer 80 or from the output of decoder 86 dependent on whether a nonfade or fade condition existed at this receiver and/or at the transmitter sending encoded preamble and data information bursts. Decoder 86 merely decodes the convolutionally encoded information using any suitable means. Format circuit 88 merely functions as an interface between the receiver and the terrestrial lines similar, but in a reverse manner, to that of format circuit 20 of FIG. 3.

Figure 10:
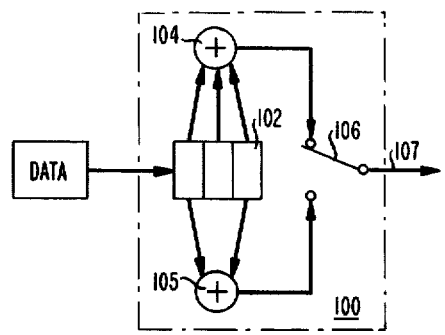
FIG. 10 illustrates a typical K=3, r=½ rate convolutional encoder.
Figure 11:
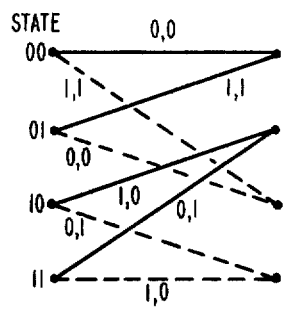
FIG. 11 illustrates a state transmission diagram and generated channel symbols for a typical K=3, r=½ rate Viterbi decoder.

Decoder 86 can comprise, for example, a Viterbi decoder whose principles are well known in the art for decoding a convolutionally encoded signal encoded in the manner of encoder 24n of FIG. 5. For simplicity of explanation, a decoder for a $K=3$, $r=\frac{1}{2}$ code will be considered. Encoding is accomplished in the manner shown in FIG. 10. Digital data at the input of the encoder 100 is serially shifted through a three-bit shift register 102. Between shifts, modulo-2 adders 104 and 105 operate on all the stored bits and the first and third bit, respectively, to produce separate outputs. A commutator 106 first selects the output from adder 104 and then selects the output of adder 105 for transmission on line 107. Upon entry of a new data bit into the encoder, permissible state transitions, and the corresponding channel bits generated, are as shown in FIG. 11 as is well known in the art.

Figure 12:
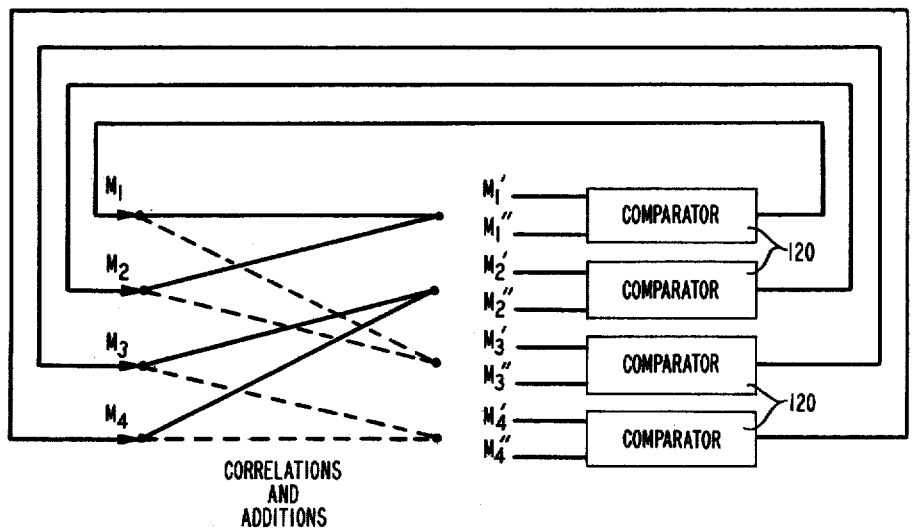
FIG. 12 illustrates a typical path metric update procedure in a Viterbi decoder for a K=3, r=½ rate convolutional code.

Decoding is accomplished in the manner shown in FIG. 12. The decoder is segmented into $2^{K-1}=4$ states, corresponding to the four possible contents of the initial two states of the shift register. The decoder must correlate the two received words with the channel bits generated for each possible transition, add the appropriate correlation to a metric representing the likelihood of each initial state, and choose in comparator 120 which of two emerging paths for each state is most likely. The metric of the surviving path for each state is retained and becomes the initial metric for subsequent calculations. Also stored, are the surviving paths (not shown) into each state, to a depth of four or five constraint lengths.

The operating speed of the Viterbi decoder is readily estimated by dividing the satellite transponder data rate by the number of ground terminals; this is an estimate of the average bit rate to a given user. Thus, for a 600 Mbit/sec. transponder and for 100 users, the required decoding speed is on the order of 6 Mbits/sec. TTL decoders which can operate at rates up to 10 Mbits/sec. are readily available. Alternatively, ECL decoders at speeds up to 50 Mbits/sec. are possible. Another option for increasing the data rate, if necessary, might be to parallel several low-speed decoders.

To maintain frame synchronization during rain attenuation conditions, a second, extended frame marker is inserted into each frame marker burst. Recalling that the initial, short frame marker was provided only to enable rapid acquisition during clear-air conditions, the second extended frame marker can be used to maintain synchronization after initial acquisition. The function of the second frame marker is analogous to the extended start-of-message word described earlier, namely, to permit identification via a slow-speed correlation-threshold as depicted in FIG. 5. Since the entire frame marker burst is stored in cache memory 72, this information can be slowly read from this memory into the correlator of Fade Frame Synch Circuit 82 to find the frame marker. Then, by counting the number of elapsed bits until the frame marker is encountered, frame synchronization can be maintained as described hereinbefore.

It is to be understood that the above-described embodiments are simply illustrative of the principles of the invention. Various other modifications and changes may be made by those skilled in the art which will embody the principles of the invention and fall within the spirit and scope thereof.

I claim:

1. In a TDMA satellite communication system comprising a satellite and a plurality of remote, spaced-apart, ground stations which communicate with one another via the satellite using message bursts in assigned time slots of a frame sequence, a transmitter capable of launching one or more message bursts during the frame sequence to each destination ground station where each message burst includes preamble and data information, the transmitter comprising:

an input capable of receiving the data information and a certain portion of the preamble information associated with each message burst to be transmitted to each destination ground station;

first means (32) capable of generating the remaining portion of the preamble information associated with each message burst to be transmitted; and means (36) capable of appropriately multiplexing the information both received at the input and generated by the first means for generating the remaining portion of the preamble information to form each message burst for transmission to a destination ground station

CHARACTERIZED IN THAT the transmitter further comprises:

control means (27) capable of generating a first control signal in response to a nonfade condition existing in transmissions between the transmitter and the destination ground station of a message burst to be transmitted, and a second control signal in response to a detected fade condition occurring in transmissions between the transmitter and a destination ground station of a message burst to be transmitted;

an encoder (24) capable of encoding an input digital signal into a redundancy encoded output signal;

second means (30) capable of generating the remaining portion of the preamble information which is an extended version of the remaining portion of the preamble information generated by the first means; and switching means (25, 38) capable of coupling both the input to the transmitter and said first means to the multiplexing means in response to a first control signal from said control means and capable of coupling both said encoder into the path between the input to the transmitter and the multiplexing means, and said second means to the multiplexing means in response to a second control signal from the control means for forming a message burst at the output of the multiplexing means.

2. A transmitter in accordance with claim 1 CHARACTERIZED IN THAT
the transmitter further comprises:
second control means (29) capable of both causing the transmission of a message burst in an assigned time slot of the frame sequence when said first control means is generating a first control signal, and causing the transmission of a message burst over a plurality of assigned time slots of the frame sequence sufficient for accommodating the extended and encoded portions of the preamble and the encoded data information when said first control means is generating a second control signal during a fade condition in the path between the transmitter and a destination ground station.

3. A transmitter in accordance with claim 1 or 2 CHARACTERIZED IN THAT
the remaining portion of the preamble information generated by said first and second generating means is related to information for enabling the processing of message bursts at a destination ground station.

4. In a TDMA satellite communication system comprising a satellite and a plurality of remote, spaced-apart, ground stations that communicate with one another via the satellite using message bursts in assigned time slots of a frame sequence and one of the ground stations transmits a frame marker unique word to each of the ground stations once during each frame sequence, a receiver capable of receiving one or more associated message bursts during a frame sequence where each message burst includes a preamble and a data information section, the receiver comprising:
an input capable of receiving the associated message bursts from the satellite; and
means (60) capable of generating from a portion of the preamble information and the remainder of the burst a recovered clock and carrier signal;
a demodulating means (71) capable of demodulating the received message bursts using the carrier signal recovered by the clock and carrier recovery means;
a bit detection means (70) capable of detecting the instantaneous value of each bit of a received burst in response to each pulse of the recovered clock signal from the clock and carrier recovery means;
a frame synchronization circuit (74) coupled to the output of the bit detection means and capable of detecting the frame marker unique word in a received bit stream and for regenerating a frame marker signal in synchronism with the normal arrival of each frame marker unique word; and
a processor (78) capable of detecting the start of a message burst associated with the receiver and for properly formatting the received message burst information for transmission to a utilization circuit CHARACTERIZED IN THAT
an associated message burst can comprise either one of a first form comprising the preamble and data information section transmitted in one time slot of the frame sequence under conditions where the fade encountered by the transmitted message burst will not exceed a predetermined system power margin, and a second form comprising a preamble section including an extended field portion and a redundancy encoded portion and a redundancy encoded data information section transmitted in a plurality of time slots of the frame sequence under conditions where the transmitted message burst is expected to experience a fade exceeding a predetermined system power margin, the receiver further comprising:
a switch controller (62) capable of both generating a first control signal during the period of a received message burst comprising said first form and generating a second control signal during the period of a received message burst comprising said second form; and
a receive timing controller (73) capable of generating proper timing signals to the processor to enable the processor to operate on each associated message burst;
and
the carrier and clock recovery means (60) comprises means capable of selectively generating the recovered clock and carrier signals from a received message burst comprising either one of said first and second form in response to a first and second control signal, respectively, from said switch controller; and
the processor (78) comprises means capable of selectively detecting the start of a message burst comprising either one of said first and second form in response to the first and second control signal, respectively, to enable the proper processing and formatting of the information contained in each received associated message burst.

5. A receiver in accordance with claim 4 CHARACTERIZED IN THAT
the carrier and clock recovery means (60) comprises:
an input;
an output;
a first carrier and clock recovery circuit (64) capable of detecting a carrier and clock unique word received in the preamble section of a message burst comprising said first form;
a second carrier and clock recovery circuit (63) capable of detecting a carrier and clock unique word received in an extended portion of the preamble section of a message burst comprising said second form; and
a switching means (61, 65, 66) capable of connecting said first carrier and clock recovery circuit between said input and output of the carrier and clock recovery means in response to a first control signal from the switch controller (62), and for connecting said second carrier and clock recovery circuit between said input and output of the carrier and clock recovery means in response to a second control signal from the switch controller, each of said first and second carrier and clock recovery circuits being capable of generating a recovered carrier and clock signal from a message burst in the first and second form, respectively.

6. A receiver in accordance with claim 4
CHARACTERIZED IN THAT
the processor (78) comprises:
  an input;
  an output;
  a first start of message detection means (83) coupled to the processor input and capable of detecting a start of message unique word received in the preamble section of an associated message burst comprising said first form and generating an enable output signal in response to such detection;
  a second start of message detection means (84) coupled to the processor input and capable of detecting a start of message unique word received in an extended portion of a preamble section of an associated message burst received in said second form and generating an enable output signal in response to such detection;
  a decoder (86) coupled to the processor input and capable of decoding a redundancy encoded portion of the preamble and the data information sections when an associated message burst is received in said second form;
  a formatting circuit (88) responsive to an enable signal for formatting an input signal into a proper form for transmission to a utilization circuit; and
  switching means (85, 87) capable of selectively coupling the enable output signal from said first and second start of message detection means to said formatting circuit in response to a first and second control signal, respectively, from the switch controller while concurrently selectively coupling an input message burst to said processor and the decoded output from said decoder to the input of said formatting circuit in response to a first and second control signal, respectively, from the switch controller.

7. A receiver in accordance with claim 4 or 6
CHARACTERIZED IN THAT
the receiver further comprises:
  a second frame synchronization circuit (82) capable of detecting a frame marker unique word received in an extended format in the output bit stream of the bit detection means and generating an output signal indicative of the point in time when said extended form frame marker unique word is detected, said second frame synchronization circuit output signal being used to enable the first frame synchronization circuit (74) to continue the regeneration of the frame marker signals under conditions when message bursts exceed said predetermined power margin.

8. In a TDMA satellite communication system comprising a satellite and a plurality of remote, spaced-apart, ground stations which communicate with one another via the satellite using message bursts comprising a preamble section and a data information section in assigned time slots of a frame sequence, a method of increasing the rain margin in transmission between two ground stations of the system when at least one of the two ground stations is experiencing a fade condition above a normal power margin of the system, the method comprising the step of:
  (a) at a transmitting ground station, transmitting the preamble and data information sections of each message burst destined for a remote receiving ground station in a normally assigned time slot of the frame sequence under conditions where no fade condition is beingexperienced at the transmitting and receiving ground station
CHARACTERIZED IN THAT
the method comprises the further step of:
  (b) transmitting the preamble and data information sections of each message burst destined for a remote receiving ground station over a plurality of time slots of the frame sequence where portions of the preamble section related to information for enabling the processing of each message burst at the receiving ground station are transmitted using extended fields and the remaining portion of the preamble section and the data information section are transmitted in a redundancy encoded form under conditions where a fade condition is experienced above the normal power margin of the system at at least one of the transmitting and receiving ground stations.

9. The method according to claim 8
CHARACTERIZED IN THAT
the method comprises the further step of:
  (c) in performing step (b), obtaining the necessary plurality of time slots for each message burst to be transmitted by assigning to the time slot that would normally be used in step (a) at least one additional time slot which is obtained from either one of (1) a pool of spare time slots forming part of the frame sequence and (2) rearranging unused time slots of the frame sequence normally assigned to transmissions between ground stations of the system.

10. The method according to claim 8 where one of the ground stations of the system is a master ground station and transmits a frame marker unique word to each of the ground stations of the system once during each frame sequence
CHARACTERIZED IN THAT
the method comprises the additional step of:
  (c) transmitting the frame marker unique word (1) in normal form for enabling a receiving ground station to achieve proper synchronization where no fade condition is experienced in the transmission of the frame marker unique word between the master ground station and a receiving ground station, and (2) in extended form for increasing the power margin of the frame marker unique word for enabling a receiving ground station to achieve proper synchronization where a fade condition is experienced above the normal power margin of the system in the transmission of a frame marker unique word between the master and a receiving ground station.

* * * * *